United States Patent [19]

Faure et al.

[11] 3,881,897
[45] May 6, 1975

[54] APPARATUS FOR SEPARATING FLUIDS

[75] Inventors: Alphonse Faure, Bron; Jacques Baudet, Roussillon, both of France

[73] Assignee: Rhone-Poulenc, S.A., Paris, France

[22] Filed: Nov. 23, 1973

[21] Appl. No.: 418,200

[30] Foreign Application Priority Data
Nov. 24, 1972 France .................. 72.41821

[52] U.S. Cl. .................................. 55/158
[51] Int. Cl. ............................. B01d 53/22
[58] Field of Search ..................... 55/16, 158

[56] References Cited
UNITED STATES PATENTS

| | | | |
|---|---|---|---|
| 3,344,586 | 10/1967 | Langley et al. | 55/158 |
| 3,410,058 | 11/1968 | Oswin | 55/158 |
| 3,499,265 | 3/1970 | Langley et al. | 55/158 |
| 3,611,676 | 10/1971 | Christen et al. | 55/16 |

*Primary Examiner*—Charles N. Hart
*Attorney, Agent, or Firm*—Stevens, Davis, Miller & Mosher

[57] ABSTRACT

Apparatus for separating fluids in which elementary cells each consisting of a porous disc with a membrane wall on each face are stacked in spaced apart relationship within a jacket, having an inlet for fluid to be treated and an outlet for the treated fluid. A central conduit is provided for extracting the fluid which has passed through the membrane walls, and the elementary cells are secured to this conduit, and the peripheries of the cells are spaced from the jacket to provide a flow passage. Baffles are interposed in the stack between each cell, and at the ends of the stack, the baffles having an aperture near the centre, so that the fluid is caused to flow alternately outwardly from the conduit and then inwardly towards the conduit again.

15 Claims, 15 Drawing Figures

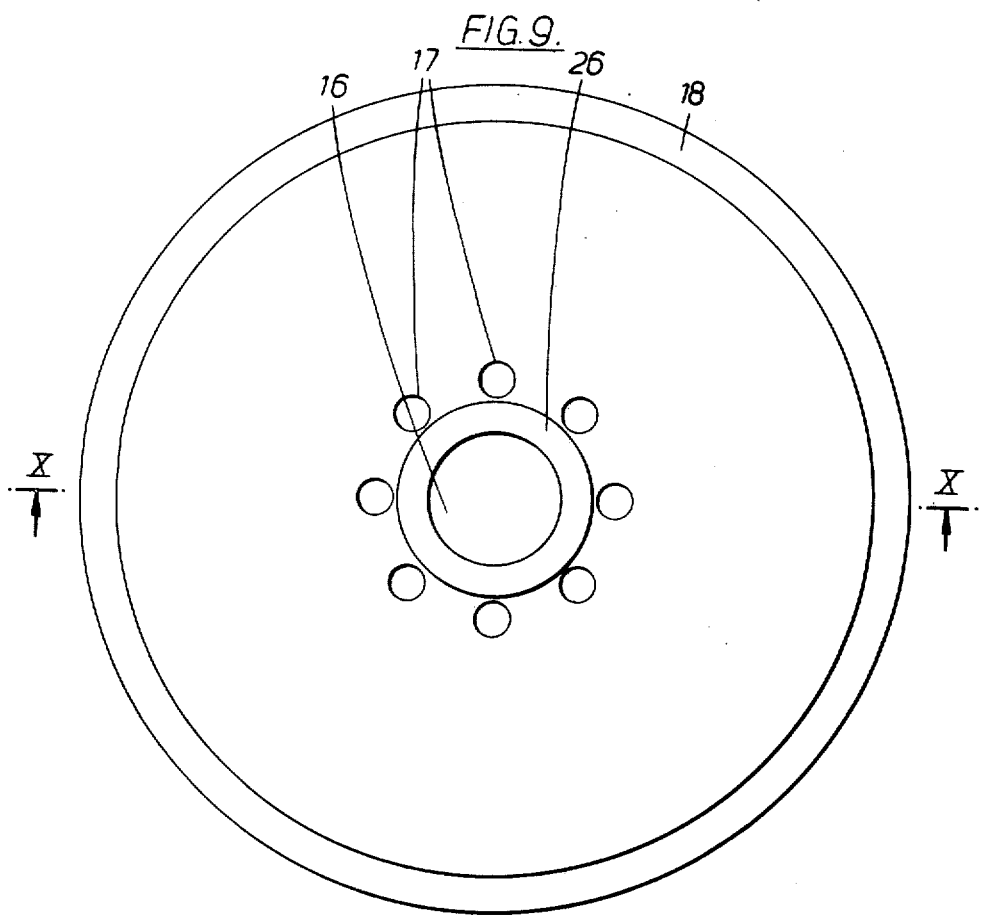
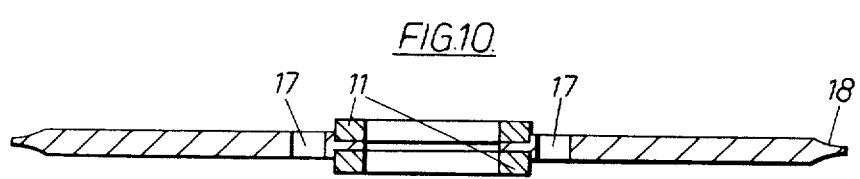

APPARATUS FOR SEPARATING FLUIDS

The present invention relates to an apparatus for separating fluids, which can be used especially in gas permeation.

The present invention relates more particularly to an apparatus comprising, inside a chamber, a stack of elementary cells around a conduit for the recovery of the fluid which has passed through the membrane walls of the said elementary cells. An apparatus of this type is described in French Pat. No. 1,412,837. However, the efficiency of this apparatus is not very good.

According to the present invention we provide apparatus for separating fluids, such apparatus comprising, a jacket having an inlet for feeding a fluid to be treated and an outlet for removing treated fluid, a stack of spaced apart elementary cells located within the jacket, between the inlet and outlet, each cell including a porous support and a membrane wall of each face of said support, a flow passage for fluid being formed at the edge of each cell, at least one baffle in contact with the internal wall of said jacket and extending thereacross between said cells, at least one conduit for the recovery of the fluid which has passed through the membrane walls, said conduit passing through an aperture in each cell, the cells being held in a leakproof manner onto the conduit, the conduit discharging exteriorly of the jacket and at least one aperture in each said baffle in the vicinity of the conduit.

Such an apparatus is simple to construct and possesses improved efficiency.

The present invention will be better understood from the following description, which is given merely by way of example, reference being made to the accompanying drawings, in which:

FIG. 9 is the partial plan view of another form of baffle;

FIG. 10 is an axial cross-section along X — X of FIG. 9 with gaskets in addition;

Figure 1:
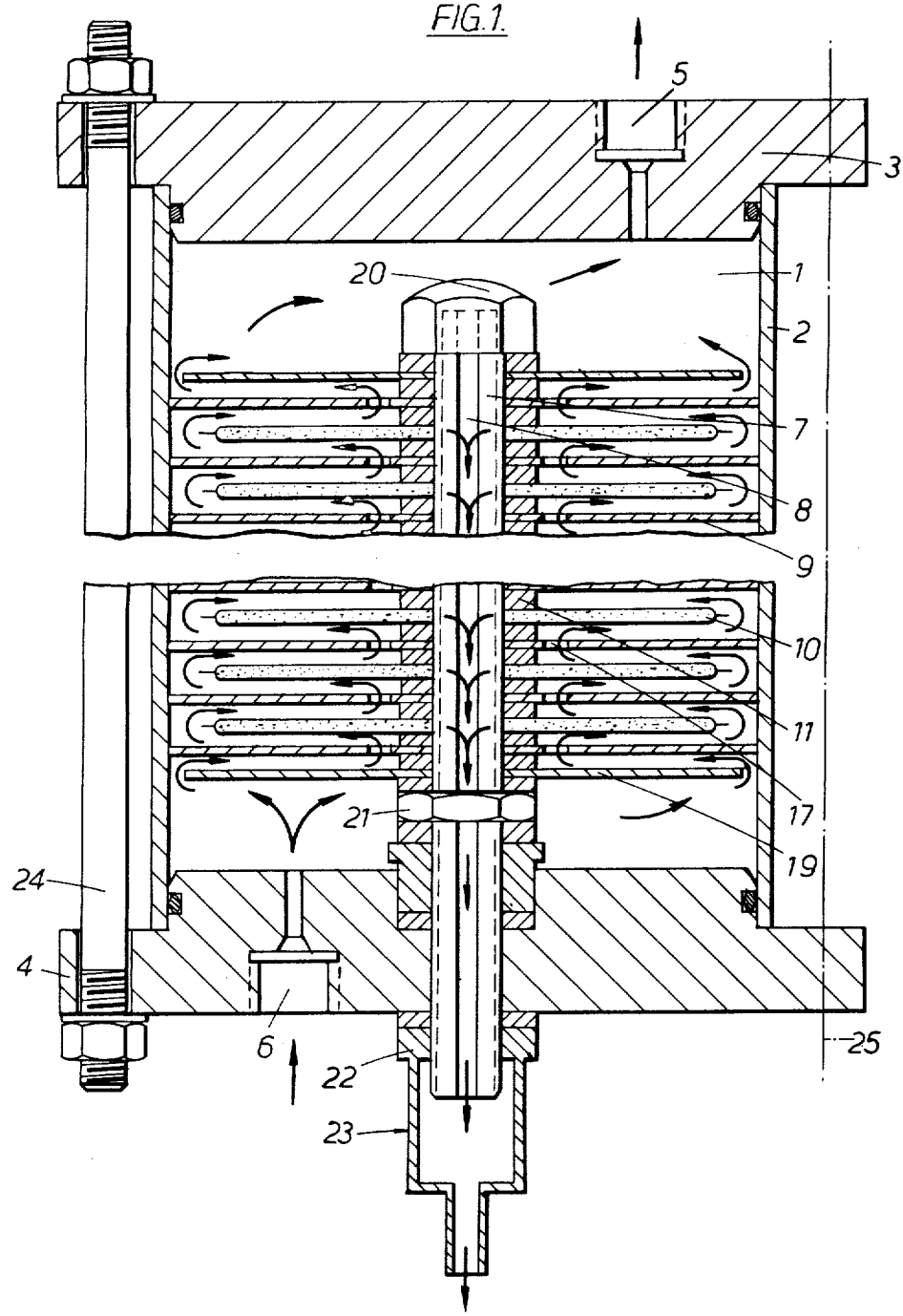
FIG. 1 is a side elevation, in axial cross-section, of one embodiment of apparatus according to the invention.

The apparatus according to the present invention, represented in FIG. 1, comprises a chamber 1 formed, for example, by a jacket 2, preferably of cylindrical shape, and by two end plates 3 and 4, at least one of which is removable, the end plates having ducts 5 and 6 respectively which provide communication between the inside of the chamber and the outside. Inside the chamber 1, there is a membrane stack around a central conduit 7 for the recovery of the fluid which has passed through the membrane walls, called the permeate in the remainder of the text. This conduit 7 can consist of a threaded rod in which three longitudinal grooves 8 are provided, through which the permeate flows. The membrane stack comprises, on the conduit 7, baffles 9 for the fluid to be treated, alternating with elementary cells 10, the latter being separated from the baffles, for example by gaskets 11.

Figure 4:
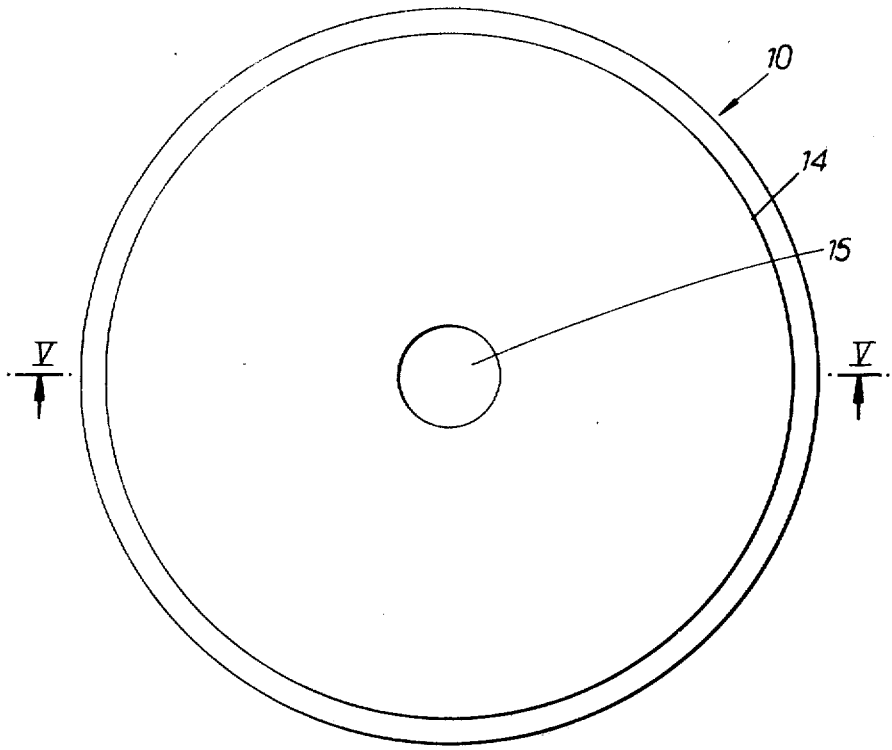
FIG. 4 is a plan view of an elementary cell of the apparatus.
Figure 5:
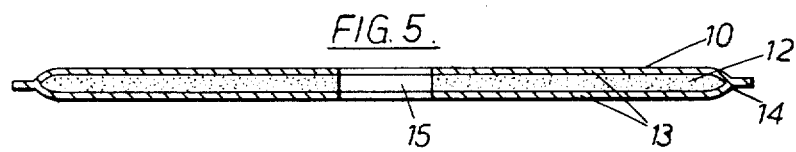
FIG. 5 is an axial cross-section along V — V of FIG. 4.

The elementary cells (one of which is shown in FIGS. 4 and 5) are formed by a porous support 12 in the form of a disc having the same cross-sectional shape as the chamber, this porous support having, on each face, a membrane wall, for example a membrane 13, the two membranes being joined in a leakproof manner near the periphery 14 of the porous support. Each elementary cell 10 has an aperture 15 inside the membrane surface area and the porous support 12, through which the conduit 7 passes. The porous supports can be made of any suitable material, and especially of sintered materials such as stainless stell, bronze, polyethylene and polyvinyl chloride. Advantageously, the porous supports are made of filter paper treated with phenolic resin and their thickness decreases towards the periphery. It is to be understood that the membrane walls of the elementary cells are not exclusively separate plane membranes, but that these membrane walls can be produced, for example, by at least one layer of dissolved polymer deposited on the porous support. Optionally, the porous support 12 of each elementary cell can result from the superposition of two elements which, between them, can form a space for the discharge of the permeates to the central conduit. It is also possible to provide a grid in the space between the two elements forming the porous support.

Figure 2:
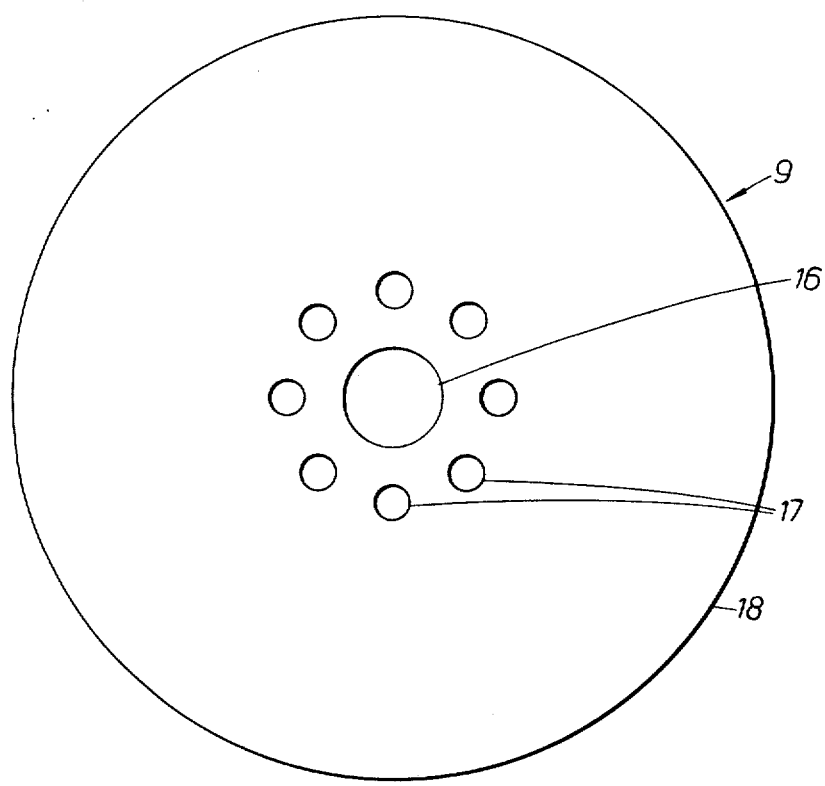
FIG. 2 is the plan view of a baffle of the apparatus of FIG. 1.

The baffles 9, one of which is represented in FIG. 2, has a central aperture 16 around the conduit 7, as well as passages 17 for the fluid to be treated. The baffles 9 have the same cross-sectional shape as the jacket 2 with which they are in contact. Advantageously, they are produced in such a way that at least their outer edge 18 has a certain flexibility and can thus, if necessary, turn over slightly in contact with the jacket 2, especially when being placed in position in the apparatus.

When the baffles 9 are flexible, it can be advantageous to provide a protective plate at each end of the membrane stack; this plate can optionally be perforated and have, for example, the shape of a disc when the jacket is cylindrical. The external diameter of these discs can thus be slightly greater than that of the elementary cells 10, but less than that of the baffles 9. These plates 19 can also be used for deflecting and distributing the gas introduced into the chamber.

Figure 3:
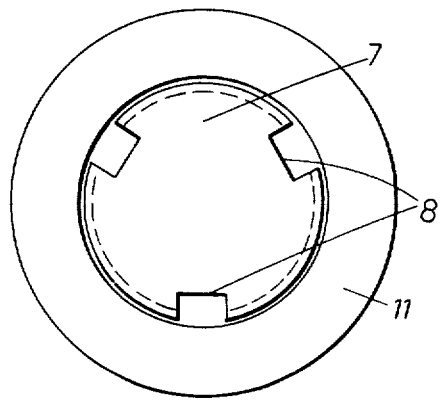
FIG. 3 is a scrap plan view of the central conduit of the apparatus of FIGS. 1 and 2 together with the adjacent spacer elements.

The membrane stack described above is placed on the conduit 7 between a blind nut 20 and a nut 21. The baffles 9, the elementary cells 10 and the gaskets 11 are not screwed on the threaded rod equipped with grooves 8 for the discharge of the permeate, but are simply stacked and tightened around the bar. FIG. 3 shows more precisely, on a larger scale, a gasket 11 around the threaded rod 7. The membrane stack is placed in the jacket 2 after having been fixed to the end plate 4 by a nut 22 onto which a tube 23 for the recovery of the permeate is welded. The two side ends 3 and 4 are held by threaded tie-rods, only one 24 of which has been represented in order to simplify the drawing in FIG. 1, another 25 being indicated solely by its centre line.

In an apparatus according to the present invention, the cross-section of the passage for the fluid through a baffle is advantageously between 0.1 and 1 times the cross-section of the passage between an elementary cell and the chamber. Furthermore, the distance between one face of a baffle and the face opposite and adjacent cell is advantageously between 0.25 and 1 times the distance separating the cell from the wall of the chamber.

An apparatus according to the present invention functions in the following manner. Referring to FIG. 1, the fluid to be treated, for example gas, passes under pressure into the chamber 1 via the duct 6 and, due to the plate 19, travels towards the cylindrical wall of the jacket 2. This plate 19 thus protects the elementary cells from gas under pressure being introduced too violently, and it also protects the membrane stack before the latter is introduced into the chamber. The gas then travels radially towards the axis of the apparatus, passes through the passages 17 of the first baffle 9, these passages 17 being near the gaskets 11, and then it turns back radially towards the wall of the chamber. As indicated by the arrows, the gas thus follows a path going from the passages 17 of one baffle to those of the next baffle, after having swept over the two opposite membrane faces of the elementary cell between two consecutive baffles. The treated gas issues from the chamber via the duct 5, this escape stream being controlled by a valve which is not shown. Of course, the apparatus functions in exactly the same way if the gas to be treated is introduced into the apparatus via the duct 5 and issues via the duct 6. The permeate is recovered by the tube 23 at the desired pressure, generally at atmospheric pressure but optionally under reduced pressure, after having passed through the membranes 13, the porous supports 12 and the orifices 15 and followed the grooves 8 in the threaded rod, as indicated by the arrows.

The baffles according to the invention make it possible for the gas to be treated to sweep through each elementary cell without dead spaces. Another advantage is to act as damping devices in the case of a sudden difference in pressure and consequently to contribute towards the protection of the elementary cells 10 when at least their outer edge 18 is flexible.

Figure 6:
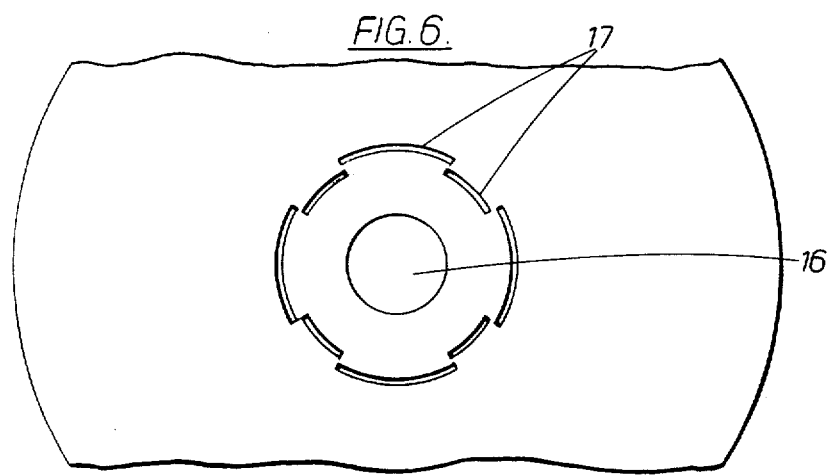
FIG. 6 is the plan view of a different embodiment of baffle.

Numerous variants of apparatuses according to the present invention will be apparent to the technician, especially in relation to the very varied shape of the passages 17. FIG. 6 shows a baffle 9 in which the passages 17, which are advantageously uniformly distributed around the aperture 16, are of elongated shape on two concentric circles. The peripheral edges 18 can be thinner than the central part of the baffle (see FIG. 10) in order to provide the desired elasticity or flexibility. It is also possible (see FIGS. 9 and 10) to provide slots 26 on each face of the baffle when the latter has sufficient thickness near the aperture 16. The gaskets 11 are placed inside these slots 26, which make it possible to prevent the gaskets 11 from creeping when the latter are of low hardness, which is advantageous when the porous supports are made of paper. They also make it possible not to damage the membranes when clamping the stack.

Figure 7:
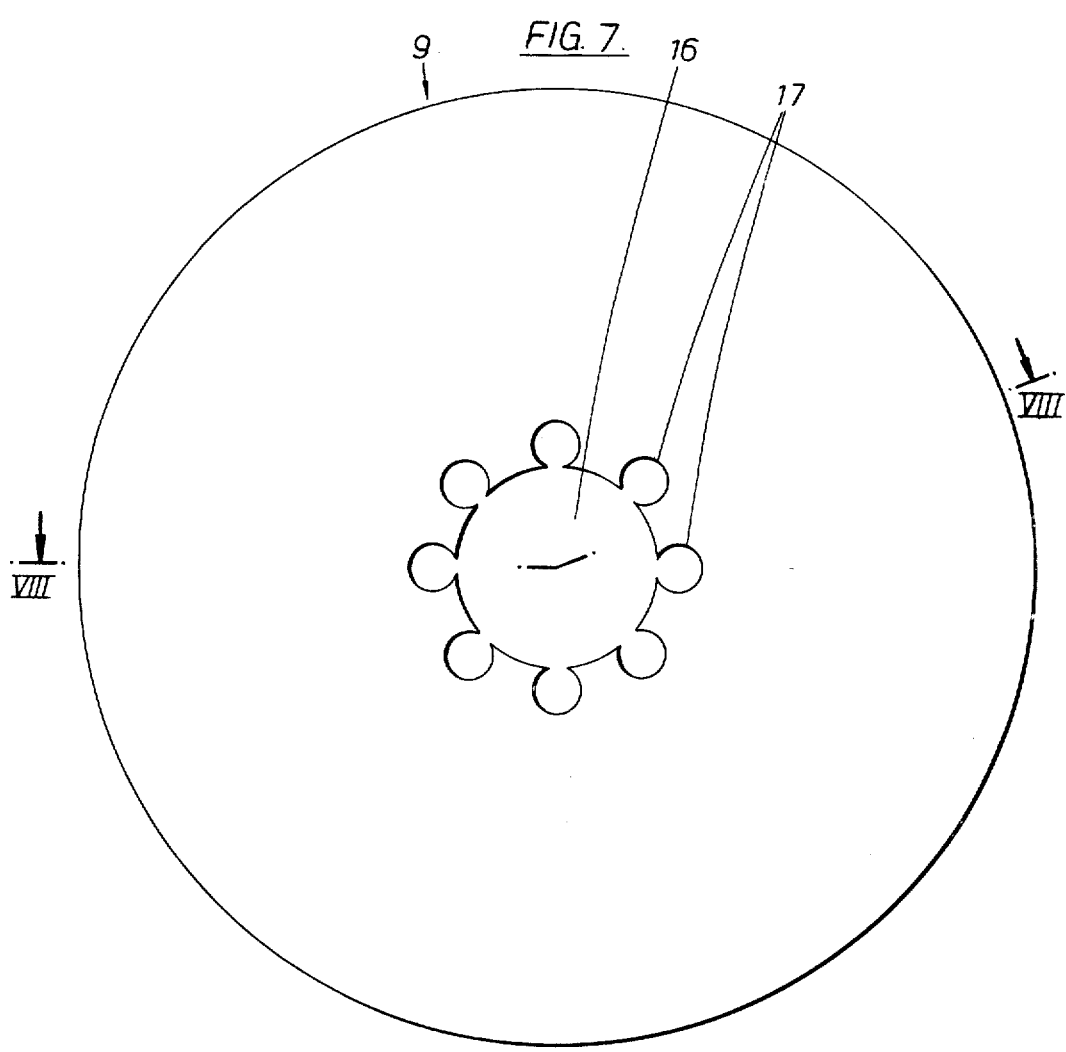
FIG. 7 is the plan view of another embodiment of baffle.
Figure 8:
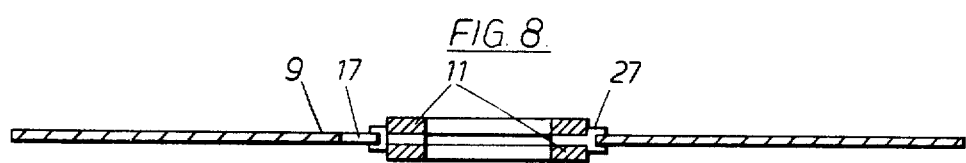
FIG. 8 is a cross-section along VIII — VIII of FIG. 7 with additional elements.

Another different embodiment is shown in FIGS. 7 and 8, in which an intermediate ring 27 is fixed in the baffle 9 itself, which is very thin and this imparts a certain flexibility to it. Gaskets 11 are placed on either side of the ring 27.

Figure 11:
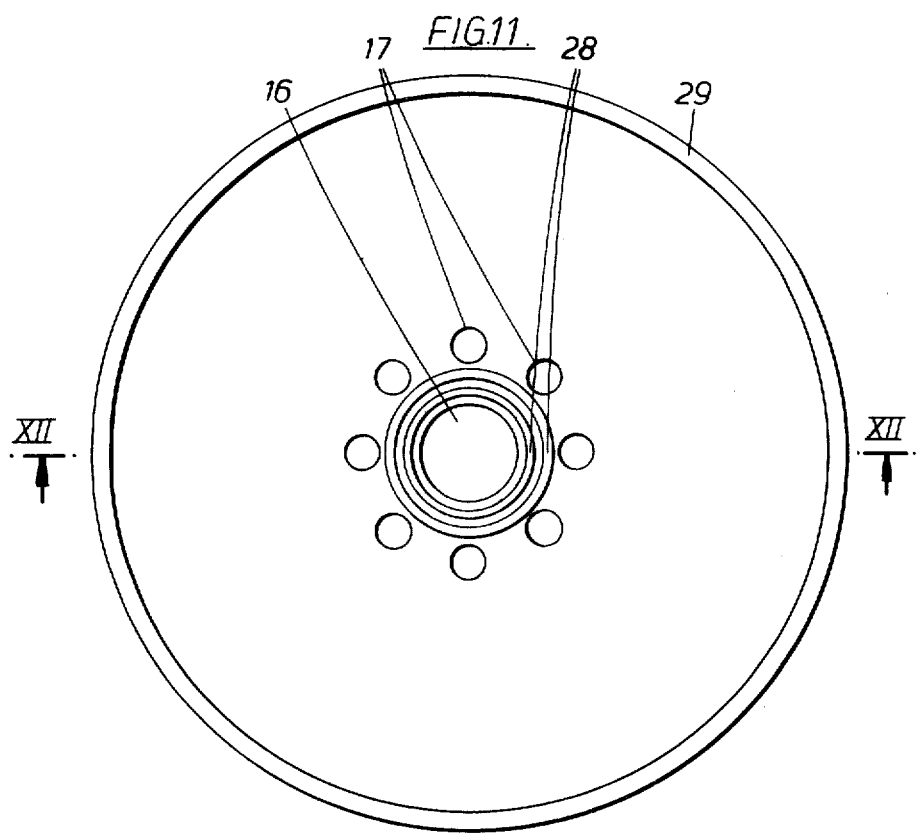
FIG. 11 is partial plan view of another embodiment of a baffle.
Figure 12:
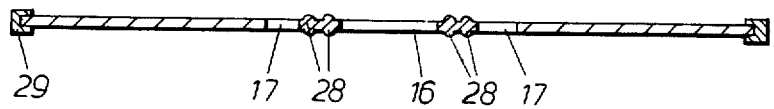
FIG. 12 is an axial cross-section along XII — XII of FIG. 11.

By way of a variant, it is also possible to dispense with the gaskets 11 and to make areas of extra thickness 28 in the form of continuous annular ribs on each face of the baffles 9 as represented in FIGS. 11 and 12. These areas of extra thickness 28 can be produced, for example, by serigraphy. In certain cases, especially when the porous support is mechanically very strong, it is possible to place the baffles 9 in contact with the internal wall of the jacket 2 by means of a gasket 29 placed on the periphery of each baffle 9.

Figure 13:
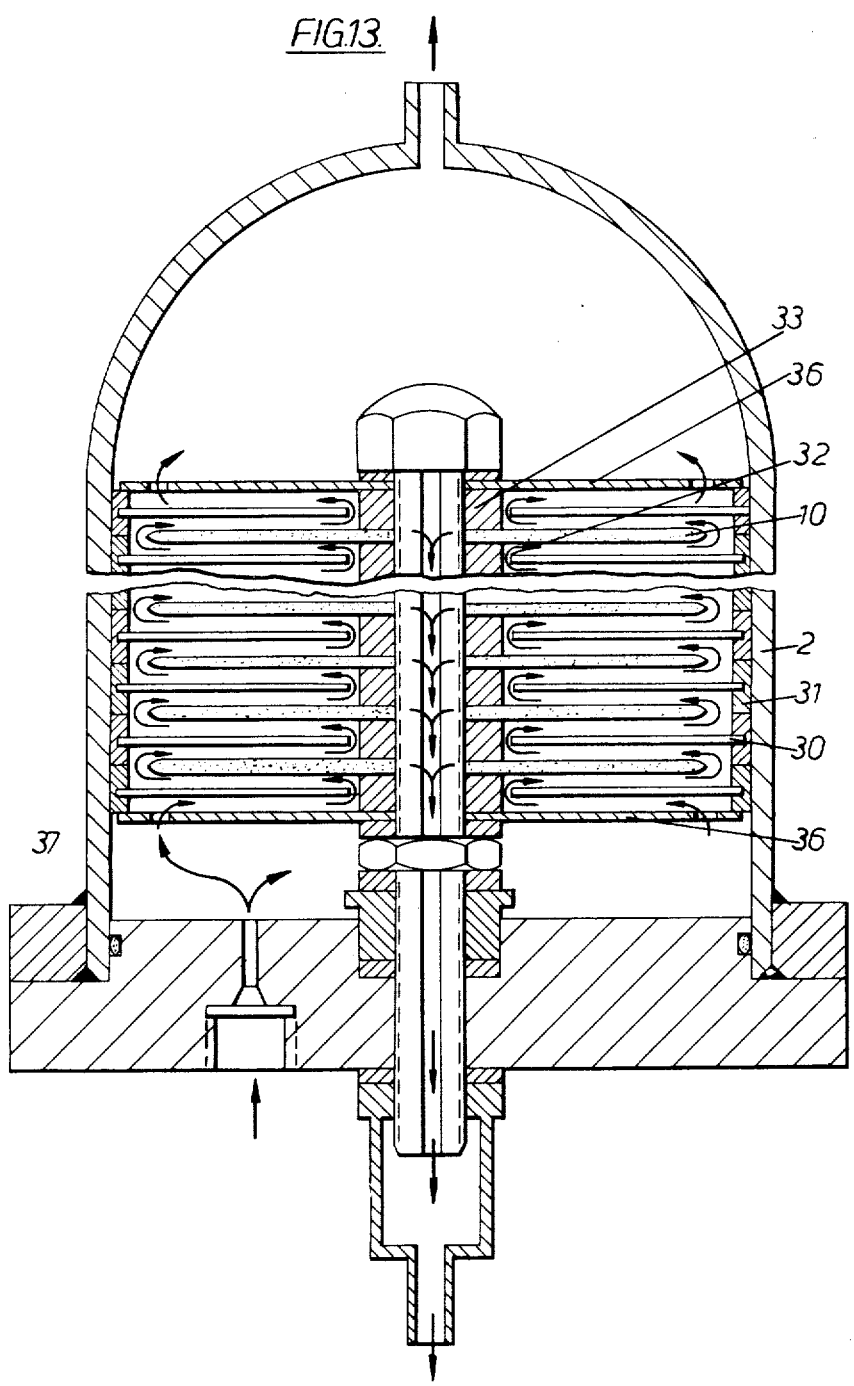
FIG. 13 is a side elevation, in axial cross-section, of another embodiment of apparatus according to the invention.

FIG. 13 shows another embodiment of an apparatus according to the invention. In this apparatus, the baffles 30 are held in the membrane stack by spacer joints 31 in contact with the internal wall of the jacket 2, the first and the last of these spacers being held, for example, by the end plates 36 having holes 37 for the passage of the fluid to be treated. These baffles 30 only contain a single circular aperture 32 for the fluid to be treated, this passage 32 being situated near the gaskets 33 separating two consecutive elementary cells. This apparatus functions in the same way as that represented in FIG. 1 and, in particular, the essentially radial flow of the fluid to be treated, passes from the vicinity of the axial pipe of the apparatus towards the internal wall of the jacket and vice versa, passing around each elementary membrane cell. In the apparatus represented in FIG. 13, the chamber comprises a removable end plate, fixed by bolts (of which only the centre lines have been represented) screwed onto a collar firmly fixed to the jacket of the chamber. Optionally, the apparatus can have one screwed end plate or two removable side plates, as with the apparatus of FIG. 1.

Figure 14:
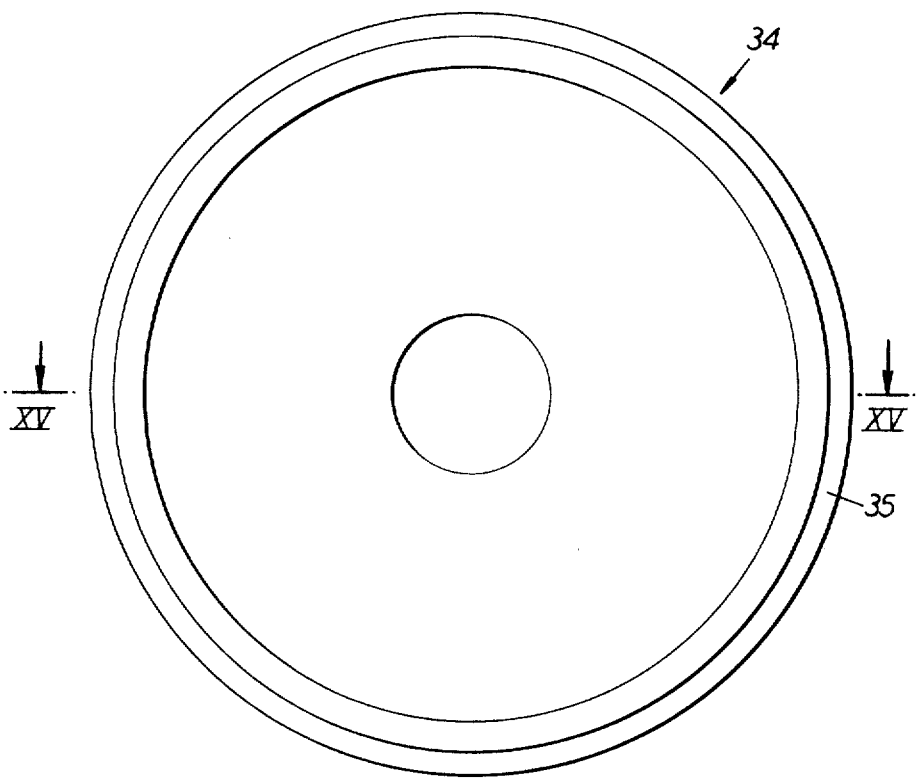
FIG. 14 is the plan view of another variant of a baffle.
Figure 15:
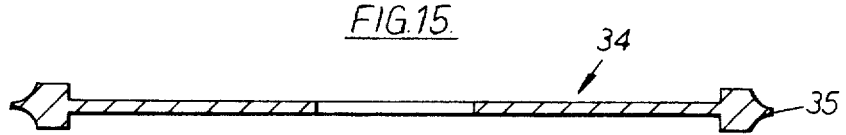
FIG. 15 is an axial cross-section along XV — XV of FIG. 14.

In an apparatus according to FIG. 13, it is possible directly to produce baffles having the shape resulting from that of the baffle 30 and the spacer 31 represented in FIG. 13. Such baffles can be produced, for example, by moulding plastics or by thermoforming. These baffles 34 can also have a thinned-down and flexible outer edge 35 in contact with the internal wall of the jacket (FIGS. 14 and 15).

An apparatus according to the present invention, which can be used for example under pressure of 25 bars, is very particularly suitable in gas permeation, especially to enrich air with oxygen to recover hydrogen present in purges, to separate hydrogen from methane in cracking gases, to purify air polluted with carbon monoxide, to recover helium mixed with air in recording balloons and dirigible balloons, to isolate helium in natural gas and the like.

The apparatus according to the invention is also suitable for pervaporation, a treatment which consists of passing at least one constituent of a liquid phase through a membrane, the constituent being in vapour form and being heated to a temperature below its boiling point at the pressure to which it is subjected.

The apparatus according to the invention can also be used for the treatment of solutions, especially by ultrafiltration or reverse osmosis.

EXAMPLE

An apparatus as shown in FIG. 1 was constructed. In the chamber 1 comprising a cylindrical steel jacket 2 of total length 300 mm and internal diameter 150 mm. This apparatus possesses 30 elementary cells 10 having a porous support 12 made of paper treated with phenolic resin (reference filflow 135/35 of Papeteries de Nanterre) of thickness 0.45 mm, the external and internal diameters of which are 120 and 21.5 mm respectively. This porous support 12 is covered with two anisotropic membranes 13 made of trimethylvinylsilane polymer, of thickness 200 microns, having an equivalent thickness of separation of 0.2 micron. These two membranes (described in French Patent 70/07 ,570) have external and internal diameters of 140 and 21.5 mm and are heat-sealed at 160.5°C near the thinned-down periphery 14 of the porous support 12.

The apparatus comprises 31 baffles 9 as shown in FIGS. 7 and 8, made of polyvinyl chloride, of thickness 0.4 mm. The external diameter of these baffles is 150 mm and they each comprise an intermediate ring 27 made of 6—6 polyamide, the internal diameter of which is 21.5 mm. These baffles 9 have eight passages 17 of diameter 8 mm, situated on a circle of diameter 42 mm, concentric with the baffle.

The gaskets 11 supported by the rim of the ring 27 are made of silicone elastomer of SHORE hardness 70 and have a thickness of 1.5. mm, their internal diameter being 21 mm and their external diameter being 33 mm.

The protective plates 19 are made of aluminium and they have a thickness of 1.5. mm, an internal diameter of 21.5 mm and an external diameter of 145 mm.

This apparatus is used at ambient temperature to enrich air with oxygen. Working with an escape rate of 6 m$^3$/hour (converted to normal conditions of temperature and pressure, namely 0°C and 760 mm (Hg) and under a pressure of 10 bars of compressed air, the flow rate of gas which has permeated (permeate) is 1.1 m$^3$/hour (normal conditions) with a 38 percent oxygen content.

By way of comparison, a test carried out with the same apparatus, without baffles but with all the other conditions being the same, gives a permeate at a practically identical flow rate but the oxygen content of which is only 31.7 percent.

It is apparent from this comparison that the baffles provide an enrichment which is 59 percent greater than that provided by the apparatus according to the prior art, assuming an initial oxygen content of 21 percent in the air.

We claim:

1. Apparatus for separating fluids, said apparatus comprising, in combination:
   a. a jacket;
   b. an inlet for feeding a fluid to be treated to said jacket;
   c. an outlet for removing treated fluid from the jacket;
   d. a stack of spaced apart elementary cells located within said jacket, between said inlet and outlet, each said cell including a porous support, a membrane wall of a polymeric material on each plane face of said support and means defining an aperture through said cell;
   e. means defining a flow passage for fluid at the edge of each cell;
   f. at least one baffle in contact with the internal wall of said jacket and extending thereacross between said cells, the said baffle being held, in a detachable manner, in the jacket by the stack of spaced apart elementary cells;
   g. at least one conduit for the recovery of the fluid which has passed through the membrane walls, said conduit passing through said apertures in said cells, the cells being held in a leakproof manner onto the conduit, the conduit discharging exteriorly of the jacket; and
   h. means defining at least one aperture in each said baffle in the vicinity of said conduit.

2. Apparatus as claimed in claim 1, and further comprising an additional baffle at each end of the stack of elementary cells, said additional baffle being spaced from the adjacent one of said elementary cells.

3. Apparatus as claimed in claim 1, wherein each baffle is held in the membrane stack by said conduit.

4. Apparatus as claimed in claim 1, wherein each baffle is held in the stack at its periphery.

5. Apparatus as claimed in claim 1, wherein each baffle is flexible, at least over its periphery in contact with said jacket.

6. Apparatus as claimed in claim 1, and further comprising a gasket between said jacket and the periphery of each said baffle.

7. Apparatus as claimed in claim 1, wherein there is only one aperture in each said baffle for the flow of fluid to be treated.

8. Apparatus as claimed in claim 1, comprising a first aperture defined between said conduit and an inner periphery to each said baffle, and at least one passage for the fluid to be treated near to said aperture.

9. Apparatus as claimed in claim 8, and further comprising areas of extra thickness on each baffle forming a continuous line around the aperture, forming a leakproof connection between the baffle and the elementary cells.

10. Apparatus as claimed in claim 1, and further comprising gaskets between each baffle and adjacent elementary cells.

11. Apparatus as claimed in claim 1, and further comprising means defining slots in each baffle, and gaskets held on each face of each baffle by said slots.

12. Apparatus as claimed in claim 1, and further comprising a ring on each baffle, and gaskets on either side of said ring.

13. Apparatus as claimed in claim 1, wherein the porous support of each elementary cell is made of paper treated with a phenolic resin.

14. Apparatus as claimed in claim 1, wherein the membrane walls are separate from the porous support and consists of two membranes each made of polyvinyltrimethylsilane, heat sealed to one another near the periphery of the porous support.

15. Apparatus as claimed in claim 1, wherein the elementary walls of each elementary cell are firmly fixed to the porous support and each consist of at least one layer of a polymer.

* * * * *